March 10, 1925.
L. M. KARNASCH ET AL
1,529,186
TURBINE CONTROL
Original Filed Aug. 17, 1922    3 Sheets-Sheet 1
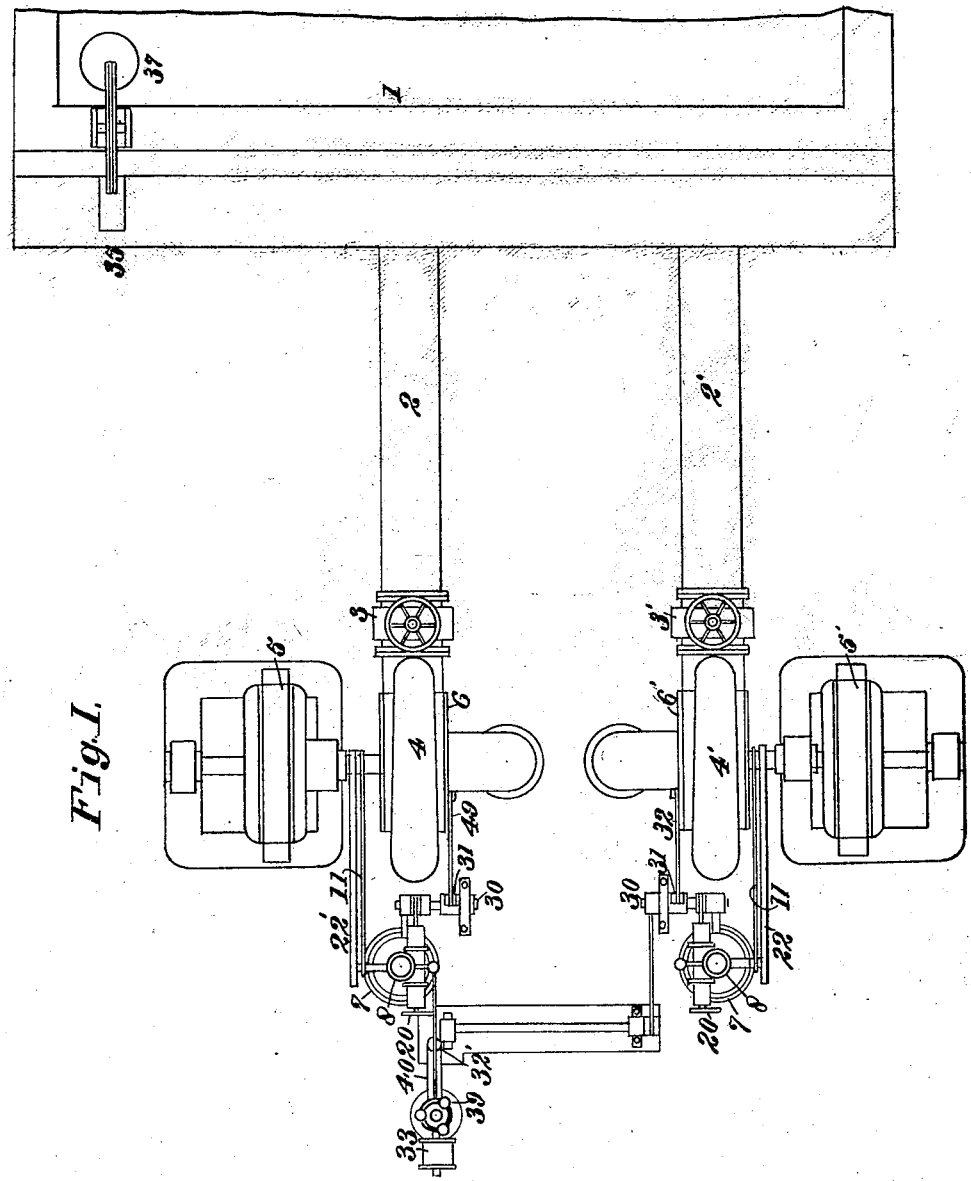
Inventors.
L. M. Karnasch,
E. C. Hutchinson.
By Harry Watters
Attorney.

March 10, 1925.

L. M. KARNASCH ET AL 1,529,186

TURBINE CONTROL

Original Filed Aug. 17, 1922    3 Sheets-Sheet 3

Inventors
L. M. Karnasch
E. C. Hutchinson.
By
Attorney

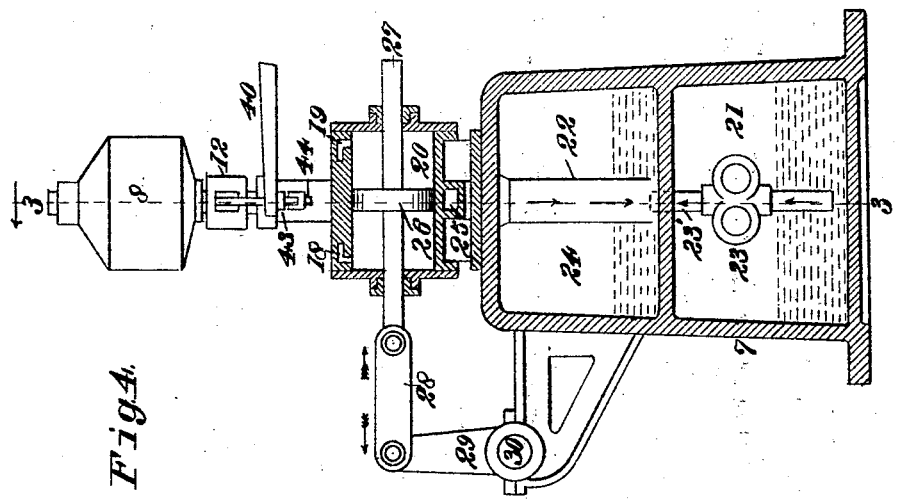
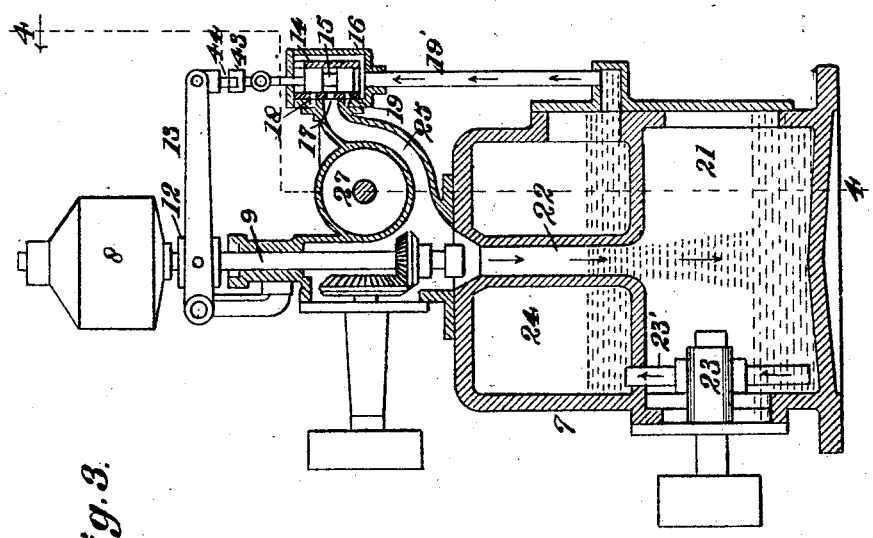

Patented Mar. 10, 1925.

1,529,186

UNITED STATES PATENT OFFICE.

LEOPOLD M. KARNASCH, OF SAN FRANCISCO, AND ELY C. HUTCHINSON, OF OAKLAND, CALIFORNIA, ASSIGNORS TO THE PELTON WATER WHEEL CO., OF SAN FRANCISCO, CALIFORNIA, A CORPORATION OF CALIFORNIA.

TURBINE CONTROL.

Original application filed August 17, 1922, Serial No. 582,374. Divided and this application filed July 1, 1924. Serial No. 723,516.

*To all whom it may concern:*

Be it known that we, LEOPOLD M. KARNASCH and ELY C. HUTCHINSON, citizens of the United States, the said KARNASCH residing in the city and county of San Francisco and State of California, and the said HUTCHINSON in the city of Oakland, Alameda County, State of California, have invented certain new and useful Improvements in Turbine Controls, of which the following is a specification.

The present application relates to turbine controls, and the same is a division of our parent case Serial No. 582,374, filed August 17th, 1922, entitled Water Level Operated Load Apportioning Device for Hydraulic Prime Movers.

In the operation of hydraulic prime movers with water conditions which are variable due to natural or other reasons, it is essential to use such quantity of water as may be available at any particular moment to the best possible advantage and with the greatest efficiency. To meet this condition of variable water supply, it is frequently found desirable to install a plurality of hydraulic prime movers to obtain the most efficient results, since under certain conditions there may be at times a variation in water flow from a quantity insufficient for the complete supplying of one hydraulic prime mover under minimum conditions which increases to a point where the flow becomes sufficient for one unit, and then exceeds the quantity required for the one unit but which excess is insufficient for two units. The quantity may continue increasing so that it becomes sufficient for two units with a surplus for use in the operation of a third, and thus increase materially. On occasion there may also be two units, each of which supplies power to a system which is independent of the other. This invention has for its principal object to provide automatic means for utilizing variable water flow to the best advantage under any of the above conditions; and to provide a device adapted for co-acting with any means or mechanism controlling the operation of an hydraulic prime mover, said means being operated preferably from a point of water source and affording a master control of the water supply to the unit without otherwise affecting the normal function of speed regulation. To provide an interlocking control for use independently of, or in combination with, the master water control whereby any one of a number of hydraulic prime movers may become a master unit to function inversely, whereby the operation of the master governor to decrease the water supply occasioned by load fluctuation will correspondingly increase the water supply in a substantially like amount and volume to another or succeeding prime mover unit, and correspondingly a movement of the master unit increasing its own supply affords a corresponding decrease to a succeeding or other unit.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in plan illustrating an installation of a plurality of hydraulic prime movers with the preferred embodiment of our invention illustrated in connection therewith.

Figure 2 is a view in side elevation of the construction illustrated in Figure 1 illustrating more particularly the rheostat or electric control operated by the water level, and certain of the master control connections.

Figure 4:
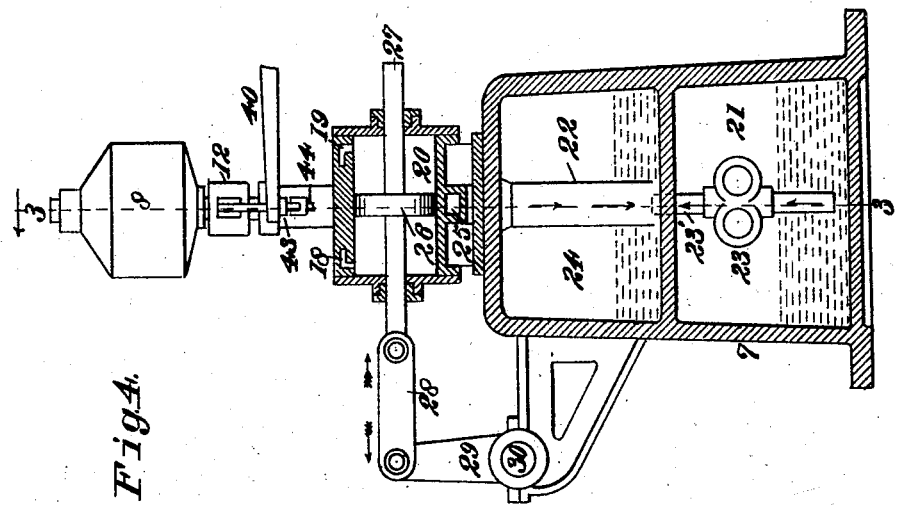
Figure 4 is a vertical sectional view taken one line 4—4 of Figure 3.
Figure 3:
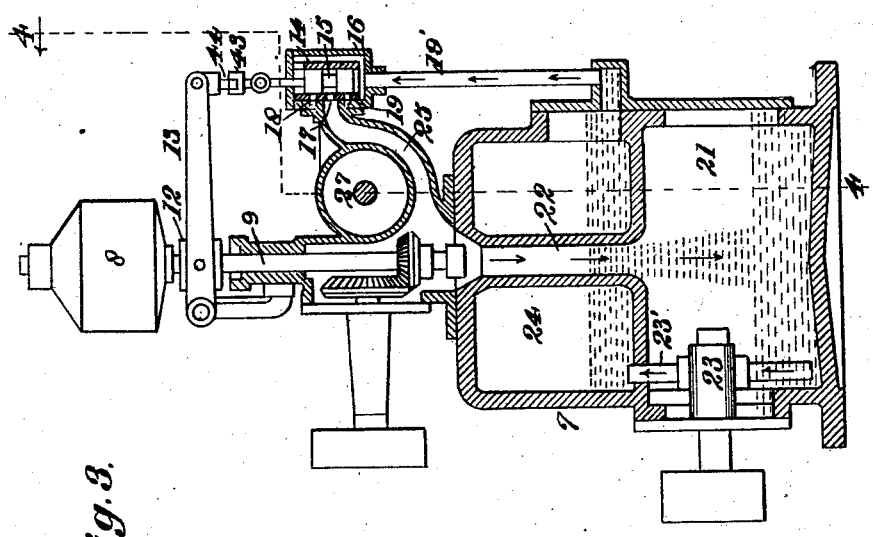
Figure 3 is a vertical sectional view of the governor control of a prime mover unit taken on line 3—3 of Figure 4.

Referring more particularly to the several views of the drawings wherein like characters of reference designate corresponding parts, 1 indicates a water way or suitable water storing enclosure from which lead the independent fluid supply pipes 2 and 2' and connected respectively through gate valves 3 and 3' with the inlets of the respective hydraulic prime movers 4 and 4'. Each prime mover is preferably mounted to operate a suitable element illustrated in the drawings in the form of generators 5 and 5'. In the drawings the hydraulic prime movers 4 and 4' are illustrated as turbine units and may be of any well known type, and in the particular embodiment each is illustrated as being provided with a guide vane control mechanisms 6 and 6', which mechanisms are operated by the hereinafter described elements, and so far as the same are duplicates in the respective units they will be designated by single characters. With each turbine is associated a governor mechanism 7 of the well known type controlled by the conventional fly ball element 8 also of the well known type. Each governor is of the fluid pressure and centrifugal type, and the element 8 thereof is operated by a rotating shaft 9 driven from the prime mover shaft 10 by a belt 11. Movable vertically on the shaft 9 is a collar 12 carried by a lever 13, the free end of which connects with a fluid controlling valve 14. The element 8 provides the primary control for the operation of the valve 14 and the movement of collar 12 on shaft 9. The valve is formed with an exhaust chamber 15 and operates within a cylinder 16 formed with the ports 17, 18 and 19 and a fluid inlet connection 19'. The ports 18 and 19 communicate through openings with the opposite ends of a cylinder 20, and the port 17 connects with the fluid sump 21 through a passage 22. Driven from the belt 22' off the shaft 10 is a pump 23 for withdrawing the fluid from the sump 21 and forcing the same under pressure through a pipe 23' into a closed fluid chamber 24, from which leads an outlet 19' communicating with the cylinder 16. Within the cylinder 20 operates a piston 26 on a rod 27, which rod is connected through a link 28 and lever 29 with oscillating shaft 30. The shaft 30 mounts a double armed lever, the arm 31 of which connects with one end of the link 32, which at its opposite end connects with the guide vane controlling mechanism conventionally shown.

The above described is a well known manner of connecting the governor to control within fixed limits the speed of the hydraulic unit dependent on variation of load on the driven member associated therewith.

To vary the operation of the prime mover in accordance with the water available, there is provided in connection with the prime mover 4 a secondary control consisting of the motor 33 operated through a power circuit 34 in which is mounted a rheostat 35, the element 36 of which is adapted for movement over the contacts of the rheostat dependent on the level of the water and consequent position of float 37 connected with the element 36. The motor has geared connection 38 with a fly ball element 39 co-operating with one end of a master lever 40 fulcrumed within its length, as at 41, on a vertically movable fulcrum 42, and its opposite end connected as at 43 with the stem 44 of valve 14.

The movement of the above described elements dependent on the level of the water in reservoir, varies the speed of the motor 33 and fly ball element 39 to pivot the lever 40 on its fulcrum and operate the valve 14 independently of its control by the fly ball element 8.

The vertically movable fulcrum member 42 connects at its lower end with an arm 45 carried by an oscillatory mounted shaft 46, the opposite end of which connects through a lever 47 and link 48 with an arm 49 carried by the shaft 30 of unit 4', the arm 49 constituting the other arm of the previously referred to double armed lever.

The operation of our installation under various water conditions is as follows:—

Assuming a variable water supply within reservoir 1, more than sufficient to supply unit 4', but insufficient for full supply of units 4'—4 and others together. During this condition, the unit 4' will operate as master unit and through its moving of rockershaft 46 and rod 42, will position the lever 40 to act as a limit to the control valve 14 of unit 4, thus maintaining the limit of water supply to the same.

With water consumption for operating the unit 4 fixed as above described, an increase in water quantity in the reservoir 1 will raise the float 37, which will in turn operate the element 36 of the rheostat and correspondingly change the speed of motor 33. This change in motor speed causes the end of lever 40 associated with element 39 to be slightly raised and its opposite end to be slightly depressed, operating valve 14 to cause the fluid under pressure to actuate piston 26 so that the same will operate the member connected with unit 4 to admit more water to said unit. A drop in the level of the water in reservoir 1 will operate the elements controlled by float 37 inversely to that just described, and diminish the water delivered through the member 6 to operate the unit.

Under conditions where a battery of units is assembled, and the available water supply while still of a variable quantity is in excess of the requirement of one turbine only, a prime mover may act as a control for the battery. In the accompanying drawing, the unit 4' and the following mechanism is illustrated as the master control and the governor 8 thereof acts to control the speed of the fluctuating load within fixed limits. The movement of the element 8 of this unit under such fluctuations is transmitted through link 48, shaft 46 and its associated arms to the member 42 causing this member to move in a direction to operate the valve 14 of unit 4 inversely to the operation of valve 14 of unit 4' enabling the unit 4 to utilize the amount of water rejected by unit 4' and vice versa. In this battery installation, it will be observed that there may be positioned the control operated by float 37. The water control may also be made interchangeable between units if desired.

We claim:—

1. In combination with an hydraulic prime mover, a primary control means for varying the water quantity delivered to said prime mover within fixed limits in accordance with the variation of load on said prime mover, and a secondary control means, operable in accordance with a variation in water volume available for supply to said prime mover unit, for varying the water quantity delivered to said unit independently of the load on said prime mover.

2. In combination with an hydraulic prime mover, a variable source of water storage for supplying thereto, a primary control means for varying the water quantity delivered to said prime mover within fixed limits in accordance with variations of load on said prime mover, and a secondary control operable in accordance with a variation of water level in the source of storage water for varying the water quantity delivered to said prime mover independently of the load on said prime mover.

3. In combination with an hydraulic prime mover, a variable source of water storage for supplying thereto, a primary control means for varying the water quantity delivered to said prime mover within fixed limits in accordance with variations of load on said prime mover and a secondary control operable in accordance with a variation of water level in the source of storage water for varying the water quantity delivered to said prime mover independently of the fixed limits of said primary control.

4. In combination with an hydraulic prime mover, a variable source of water storage for supplying thereto, a primary control means for varying the water quantity delivered to said prime mover within fixed limits in accordance with variations of load on said prime mover, and a secondary control operable in accordance with a variation of water level in the source of storage water for varying the water quantity delivered to said prime mover independently of the fixed limits of said primary control and the load on said prime mover.

5. In combination with an hydraulic prime mover, a variable source of water storage for supplying thereto, and a control for varying the quantity of water delivered to said prime mover in accordance with a variation of water level in the source of water supply, independently of the load on said prime mover.

In testimony whereof we have signed our names to this specification.

LEOPOLD M. KARNASCH.
ELY C. HUTCHINSON.